(12) United States Patent
Lambert

(10) Patent No.: US 11,748,288 B2
(45) Date of Patent: Sep. 5, 2023

(54) DISCOVERY AND SAFE ENABLEMENT OF HIGH-SPEED MANAGEMENT INTERFACE VIA PCIE CARD ELECTRO-MECHANICAL CONNECTOR

(71) Applicant: Dell Products L.P., Round Rock, TX (US)

(72) Inventor: Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/227,022

(22) Filed: Apr. 9, 2021

(65) Prior Publication Data

US 2022/0327079 A1  Oct. 13, 2022

(51) Int. Cl.
G06F 13/36 (2006.01)
G06F 13/40 (2006.01)
G06F 13/42 (2006.01)

(52) U.S. Cl.
CPC ...... *G06F 13/4027* (2013.01); *G06F 13/4282* (2013.01); *G06F 2213/0026* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 6,168,077 B1* | 1/2001 | Gray | G06K 19/07733 235/375 |
| 6,928,562 B2* | 8/2005 | Cohen | G06F 1/32 713/323 |
| 2008/0034106 A1* | 2/2008 | Bakshi | G06F 1/3203 709/238 |
| 2018/0293197 A1* | 10/2018 | Grobelny | G06F 13/4081 |
| 2020/0351547 A1* | 11/2020 | Sivertsen | H04N 21/43637 |
| 2021/0056191 A1* | 2/2021 | Emerson | G06F 3/14 |
| 2022/0015262 A1* | 1/2022 | Rider | H05K 7/20254 |

* cited by examiner

*Primary Examiner* — Henry Tsai
*Assistant Examiner* — Dean Phan
(74) *Attorney, Agent, or Firm* — Jackson Walker L.L.P

(57) ABSTRACT

An information handling system may include a host system including a processor and a management controller communicatively coupled to the processor and configured for out-of-band management of the host system. The information handling system may also include a Universal Serial Bus (USB) interface communicatively coupled to the management controller via a Peripheral Component Interconnect Enhanced (PCIe) card electro-mechanical (CEM) connector. The host system may implements a host-side subsystem configured to engage CEM terminations in response to a USB mode of the host-side subsystem being disabled and the host-side subsystem being in a main power state and selectively enable communication to and from a USB host of the host system via the PCIe CEM connector based on the USB mode of the host-side subsystem.

19 Claims, 3 Drawing Sheets

| PWR STATES | LCL MAIN PWRGD | USER USB MODE MODE_USB1_JTAG0 | SYSTEM SIDE USB MODE MODE_USB0_JTAG1 | SYSTEM LOGIC ALLOW_USB_MODE | MODE |
|---|---|---|---|---|---|
| DEFAULT | X (DON'T CARE) | 0 | 0 | 0 | LOOPBACK |
| DEFAULT | X (DON'T CARE) | 0 | 1 | 1 | LOOPBACK |
| S5 AUX ONLY | 0 | 1 | 0 | 0 | LOOPBACK |
| S5 AUX ONLY | 0 | 1 | 1 | 1 | USB |
| S5 AUX ONLY | 1 | 0 | 0 | 0 | LOOPBACK |
| S5 AUX ONLY | 1 | 0 | 1 | 1 | LOOPBACK |
| S0 MAIN ONLY | 0 | 0 | 1 | 0 | LOOPBACK |
| S0 MAIN ONLY | 0 | 0 | 1 | 1 | LOOPBACK |
| S0 MAIN ONLY | 1 | 1 | 0 | 0 | LOOPBACK |
| S0 MAIN ONLY | 1 | 1 | 0 | 1 | USB |
| S0 MAIN AND S5 AUX | 0 | 1 | 0 | 0 | LOOPBACK |
| S0 MAIN AND S5 AUX | 0 | 1 | 0 | 1 | USB |
| S0 MAIN AND S5 AUX | 1 | 1 | 0 | 0 | LOOPBACK |
| S0 MAIN AND S5 AUX | 1 | 1 | 0 | 1 | USB |

FIG. 3

DISCOVERY AND SAFE ENABLEMENT OF HIGH-SPEED MANAGEMENT INTERFACE VIA PCIE CARD ELECTRO-MECHANICAL CONNECTOR

TECHNICAL FIELD

The present disclosure relates in general to information handling systems, and more particularly to methods and systems for discovering and providing for sage enablement of a high-speed management interface via a Peripheral Component Interconnect Express (PCIe) card electro-mechanical (CEM) connector.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many use cases may exist for sideband management of an information handling system using a PCIe CEM connector, such as root of trust attestation, image updates, shared network management, telemetry, universal asynchronous receiver/transmitter (UART), add-in card firmware recovery, general purpose input/output (GPIO) control, debugging, in-band interrupts, innate plug-n-play support, and others.

Current approaches do not provide such sideband management support for a high-speed connector, such as Universal Serial Bus (USB) 2.0 high speed support.

SUMMARY

In accordance with the teachings of the present disclosure, the disadvantages and problems associated with enabling a high-speed management interface via a PCIe CEM connector may be reduced or eliminated.

In accordance with embodiments of the present disclosure, an information handling system may include a host system including a processor and a management controller communicatively coupled to the processor and configured for out-of-band management of the host system. The information handling system may also include a Universal Serial Bus (USB) interface communicatively coupled to the management controller via a Peripheral Component Interconnect Enhanced (PCIe) card electro-mechanical (CEM) connector. The host system may implements a host-side subsystem configured to engage CEM terminations in response to a USB mode of the host-side subsystem being disabled and the host-side subsystem being in a main power state and selectively enable communication to and from a USB host of the host system via the PCIe CEM connector based on the USB mode of the host-side subsystem.

In accordance with these and other embodiments of the present disclosure, a method may be provided for use in an information handling system having a host system including a processor including a processor and a management controller communicatively coupled to the processor and configured for out-of-band management of the host system and the information handling system further including Universal Serial Bus (USB) interface communicatively coupled to the management controller via a Peripheral Component Interconnect Enhanced (PCIe) card electro-mechanical (CEM) connector. The method may include engaging, with a host-side subsystem, CEM terminations in response to a USB mode of the host-side subsystem being disabled and the host-side subsystem being in a main power state. The method may further include selectively enabling, with the host-side subsystem, communication to and from a USB host of the host system via the PCIe CEM connector based on the USB mode of the host-side subsystem.

In accordance with these and other embodiments of the present disclosure, a Universal Serial Bus (USB) interface may be configured to communicatively couple to a management controller of an information handling system via a Peripheral Component Interconnect Enhanced (PCIe) card electro-mechanical (CEM) connector and based on presence or absence of regulation of a local main power rail for the USB interface, selectively enable and disable a USB mode of the USB interface.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a truth table demonstrating an example relationship among system power states, local main power grid regulation, card mode, system logic mode, system USB enable mode, and loopback/or USB mode, in accordance with embodiments of the present disclosure.

DETAILED DESCRIPTION

Figure 1:
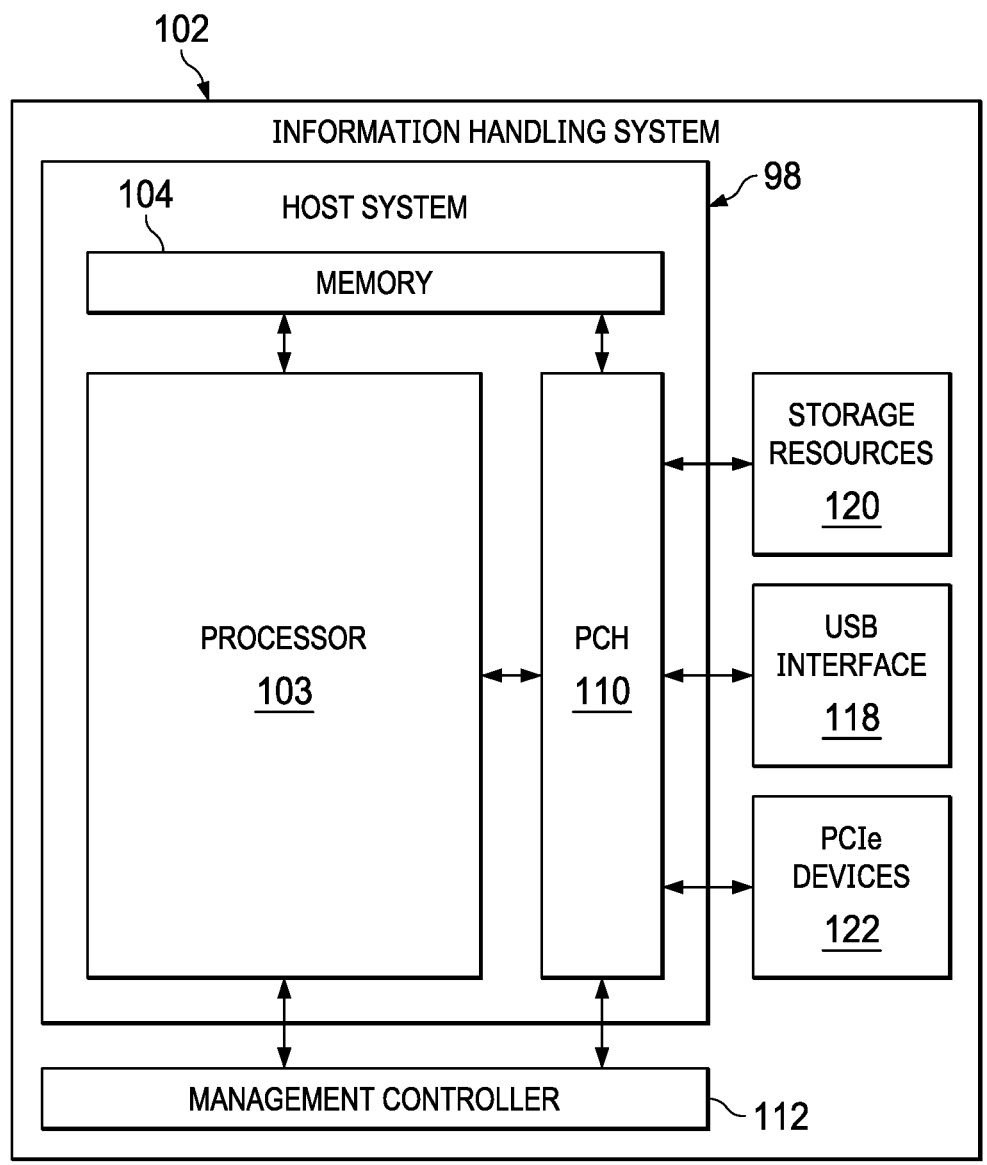
FIG. 1 illustrates a block diagram of an example information handling system, in accordance with embodiments of the present disclosure.
Figure 2:
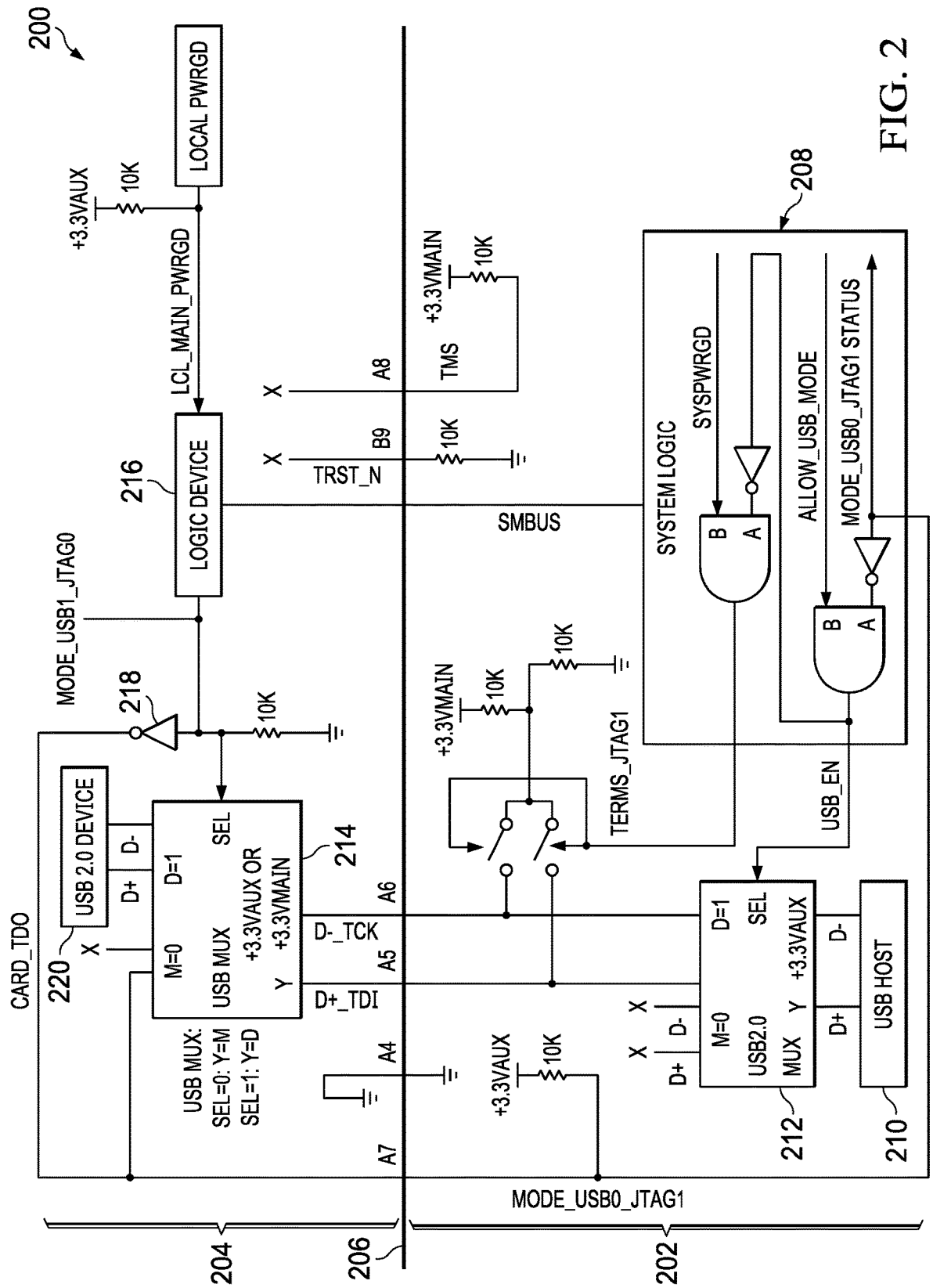
FIG. 2 illustrates a block diagram of an example system for discovery and enablement of a high-speed management interface via a PCIe CEM, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.).

As depicted in FIG. 1, information handling system 102 may include a processor 103, a management controller 112 communicatively coupled to processor 103, a platform controller hub (PCH) 110 communicatively coupled to processor 103 and management controller 112, a memory 104 communicatively coupled to processor 103 via PCH 110, a USB interface 118 communicatively coupled to processor 103 via PCH 110, one or more storage resources 120 communicatively coupled to processor 103 via PCH 110, and one or more PCIe devices 122 communicatively coupled to processor 103 via PCH 110. In operation, processor 103, memory 104, and PCH 110 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Management controller 112 may be configured to provide management facilities for management of information handling system 102. Such management may be made by management controller 112 even if information handling system 102 is powered off or powered to a standby state. Management controller 112 may include a processor, a memory, and/or other components. In certain embodiments, management controller 112 may include or may be an integral part of an embedded controller (EC), baseboard management controller (BMC), or a remote access controller (e.g., a Dell Remote Access Controller or Integrated Dell Remote Access Controller). In some embodiments, management controller 112 may be communicatively coupled to processor 103 via a Platform Environment Control Interface (PECI).

PCH 110 may be any system, device, or apparatus configured to control certain data paths (e.g., data flow between processor 103, memory 104, and peripherals) and support certain functions of processor 103. A PCH 110 may also be known as a "chipset" of an information handling system 102. For example, one such function may include implementing a management engine. A management engine may comprise hardware and/or firmware that enables remote out-of-band management for information handling system 102 in order to monitor, maintain, update, upgrade, and/or repair information handling system 102. In some embodiments, PCH 110 may be communicatively coupled to management controller 112 via an extended Serial Peripheral Interface (eSPI).

USB interface 118 may comprise any suitable system, device, or apparatus configured to serve as an interface in accordance with the USB specification. In some embodiments, USB interface 118 may comprise a USB 2.0-supporting card having backward compatibility to prior versions of the USB standard, and may be configured to interface with PCH 110 via a PCIe CEM 206 connector.

A storage resource 120 may include one or more hard disk drives, magnetic tape libraries, optical disk drives, magneto-optical disk drives, compact disk drives, compact disk arrays, disk array controllers, and/or any other system, apparatus or device operable to store media. In some embodiments, storage resources 120 may comprise a plurality of physical storage resources that may appear to an operating system or virtual machine executing on information handling system 102 as a single logical storage unit or virtual storage resource. For example, each such virtual storage resource may comprise a RAID. Thus, in some embodiments, a virtual storage resource may comprise a redundant array of physical storage resources. In the same or alternative embodiments, a virtual storage resource may be implemented using a RAID standard. Although FIG. 1 depicts storage resources 120 internal to information handling system 102, in some embodiments, storage resources 120 may be external to information handling system 102 (e.g., embodied by a physical array of external hard disk drives).

A PCIe device 122 may be communicatively coupled to processor 103 via PCH 110 and may generally include any information handling resource. In some embodiments, one or more PCIe devices 122 may be coupled to processor 103 via a PCIe interface.

In addition to processor 103, memory 104, management controller 112, PCH 110, USB interface 118, storage resources 120, and PCIe devices 122, information handling system 102 may include one or more other information handling resources.

FIG. 2 illustrates a block diagram of an example system 200 for discovery and enablement of a high-speed management interface via a PCIe CEM, in accordance with embodiments of the present disclosure. As shown in FIG. 2, system 200 may include a host-side system 202 supporting USB and a USB-supporting card 204 having backward compatibility coupled to host-side system 202 via a PCIe CEM connector. Components of host-side system 202 may be implemented by PCH 110 and management controller 112 while USB-supporting card 204 may be implemented by USB interface 118.

As shown in FIG. 2, host-side system 202 may include system logic 208 configured to control Joint Test Action Group (JTAG) terminations (e.g., via a control signal Terms_JTAG1), selectively enable and disable USB functionality for host-side system 202 (e.g., via a control signal USB_EN, which may be a push-pull type signal) based on a JTAG status signal (e.g., MODE_USB0_JTAG1 Status). In some embodiments, system logic 208 may be implemented by management controller 112.

In operation, system logic 208 may ensure that JTAG terminations only engage when host-side system 202 is not in a USB mode and host-side system 202 is in a main power state (e.g., as indicated by control signal SYSPWRGD). Otherwise, an auxiliary power supply needed on MODE_USB0_JTAG1 may leak through USB multiplexer (MUX) 214 and switch to a main power supply. Further, system logic 208 may ensure that host-side system 202 is granted USB mode permission to a data out CARD_TDO signal such that that if a PCIe add in card is spuriously toggling the data out CARD_TDO signal, then system logic may observe such toggling and qualify the control signal USB_EN for USB MUX 212 with the Allow_USB_MODE signal. Thus, a "misbehaving card" may be detected by system logic and the USB connections may be blocked.

The control signal USB_EN may be used as a select signal for a USB MUX 212 which may selectively pass data to and from a USB host 210 based on control signal USB_EN. In some embodiments, USB MUX 212 may comprise a USB 2.0 hub, multiplexer, or switch. In some embodiments, USB host 210 and USB MUX 212 may be implemented in whole or in part by PCH 110.

As shown in FIG. 2, USB-supporting card 204 may include a logic device 216 (e.g., a programmable logic device, an application-specific integrated circuit, or other logic device) configured to generate a control signal MODE_USB_JTAG0 based on whether local main power rails are in regulation (e.g., as indicated by LCL_Main_PWRGD) and System Management BUS (SMBUS) signals received from system logic 208, and communicate such control signal MODE_USB_JTAG0 as a multiplexer select signal to USB MUX 214 and an open-drain inverter 218 (which in some embodiments, may be implemented as an integral component of logic device 216). Accordingly, if local main power rails are not in regulation, logic device 216 may cause open-drain inverter 218 to drive its output (e.g., control signal CARD_TDO) low and otherwise, if local main power rails are in regulation, cause the output of open-drain inverter 218 to have a high-impedance output.

As further shown in FIG. 2, based on the multiplexer select signal (MODE_USB_JTAG0) received by USB MUX 214, USB MUX 214 may either pass data signals to and from a USB device 220 (e.g., coupled to USB interface 118) when the USB mode of system 200 is enabled, and otherwise operate in an input-to-output (TDI to TDO) loopback mode when the USB mode of host-side system 202 is disabled, in order to complete a scan chain loop for backward compatibility.

To further illustrate operation of system 200, FIG. 3 illustrates a truth table demonstrating an example relationship among system power states (e.g., Advanced Configuration and Power Interface power states S0 and S5), local main power grid regulation (e.g., as indicated by LCL_Main_PWRGD), card USB mode (e.g., as indicated by MODE_USB1_JTAG0), system-side USB mode (e.g., as indicated by MODE_USB0_JTAG1), system USB enable mode (e.g., as indicated by ALLOW_USB_MODE), and whether USB MUX 214 operates in a loopback/or USB mode, in accordance with embodiments of the present disclosure.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a host system including a processor and a management controller communicatively coupled to the processor and configured for out-of-band management of the host system, wherein the management controller is selected from: a baseboard management controller and a remote access controller;
   a Universal Serial Bus (USB) interface communicatively coupled to the management controller via a Peripheral Component Interconnect Enhanced (PCIe) card electro-mechanical (CEM) connector; and
   a USB device coupled to the USB interface;
   wherein the host system implements a host-side subsystem configured to:
      engage CEM terminations in response to a USB mode of the host-side subsystem being disabled and the host-side subsystem being in a main power state; and
      selectively enable communication to and from a USB host of the host system via the PCIe CEM connector based on the USB mode of the host-side subsystem wherein the USB mode is determined based, in part, on a Joint Test Action Group (JTAG) control signal for controlling JTAG terminations to ensure JTAG terminations are engaged only when the USB mode is disabled.

2. The information handling system of claim 1, wherein the management controller engages CEM terminations in response to a USB mode of the host-side subsystem being disabled and the host-side subsystem being in a main power state.

3. The information handling system of claim 1, wherein one of a USB multiplexer, USB hub, or a USB switch selectively enables communication to and from a USB host of the host system via the PCIe CEM connector based on the USB mode of the host-side subsystem.

4. The information handling system of claim 1, wherein the USB interface is configured to, based on presence or absence of regulation of a local main power rail for the USB interface, selectively enable and disable a USB mode of the USB interface.

5. The information handling system of claim 4, wherein the USB interface is further configured to, when the USB mode of the USB interface is enabled, enable communication of a USB device to and from the PCIe CEM connector.

6. The information handling system of claim 5, wherein the USB interface is further configured to:
   when the USB mode of the USB interface is enabled, cause a looped back data out signal associated with the USB interface to be driven low; and
   when the USB mode of the USB interface is disabled, caused the looped back data out signal associated with the USB interface to be driven based on a data in signal to the USB interface.

7. The information handling system of claim 4, wherein one of a USB multiplexer, USB hub, or a USB switch is configured to enable communication of a USB device to and from the PCIe CEM connector when the USB mode of the USB interface is enabled.

8. A method comprising, in an information handling system having a host system including a processor including a processor and a management controller communicatively coupled to the processor and configured for out-of-band management of the host system, wherein the management controller is selected from: a baseboard management controller and a remote access controller, and wherein the information handling system further includes a Universal Serial Bus (USB) interface communicatively coupled to the management controller via a Peripheral Component Interconnect Enhanced (PCIe) card electro-mechanical (CEM) connector and a USB device coupled to the USB interface:
   engaging, with a host-side subsystem, CEM terminations in response to a USB mode of the host-side subsystem being disabled and the host-side subsystem being in a main power state; and
   selectively enabling, with the host-side subsystem, communication to and from a USB host of the host system via the PCIe CEM connector based on the USB mode of the host-side subsystem wherein the USB mode is determined based, in part, on a Joint Test Action Group (JTAG) control signal for controlling JTAG terminations to ensure JTAG terminations are engaged only when the USB mode is disabled.

9. The method of claim 8, further comprising the management controller engaging CEM terminations in response to a USB mode of the host-side subsystem being disabled and the host-side subsystem being in a main power state.

10. The method of claim 8, wherein one of a USB multiplexer, USB hub, or a USB switch selectively enables communication to and from a USB host of the host system via the PCIe CEM connector based on the USB mode of the host-side subsystem.

11. The method of claim 8, wherein the USB interface is configured to, based on presence or absence of regulation of a local main power rail for the USB interface, selectively enable and disable a USB mode of the USB interface.

12. The method of claim 11, wherein the USB interface is configured to, when the USB mode of the USB interface is enabled, enable communication of a USB device to and from the PCIe CEM connector.

13. The method of claim 12, wherein the USB interface is further configured to:
   when the USB mode of the USB interface is enabled, cause a looped back data out signal associated with the USB interface to be driven low; and when the USB mode of the USB interface is disabled, caused the looped back data out signal associated with the USB interface to be driven based on a data in signal to the USB interface.

14. The method of claim 11, wherein one of a USB multiplexer, USB hub, or a USB switch is configured to enable communication of a USB device to and from the PCIe CEM connector when the USB mode of the USB interface is enabled.

15. A Universal Serial Bus (USB) interface comprising:
a USB card configured to:
   communicatively couple to a management controller of an information handling system via a Peripheral Component Interconnect Enhanced (PCIe) card electro-mechanical (CEM) connector, wherein the USB interface is coupled to a USB device, the management controller is communicatively coupled to a processor of the information handling system and configured for out-of-band management of the host system and wherein the management controller is selected from: a baseboard management controller and a remote access controller; and
   based on presence or absence of regulation of a local main power rail for the USB interface, selectively enable and disable a USB mode of the USB interface wherein the USB mode is determined based, in part, on a Joint Test Action Group (JTAG) control signal for controlling JTAG terminations to ensure JTAG terminations are engaged only when the USB mode is disabled.

16. The USB interface of claim 15, further configured to, when the USB mode of the USB interface is enabled, enable communication of a USB device to and from the PCIe CEM connector.

17. The USB interface of claim 16, further configured to:
   when the USB mode of the USB interface is enabled, cause a looped back data out signal associated with the USB interface to be driven low; and
   when the USB mode of the USB interface is disabled, caused the looped back data out signal associated with the USB interface to be driven based on a data in signal to the USB interface.

18. The USB interface of claim 15, wherein one of a USB multiplexer, USB hub, or a USB switch is configured to enable communication of a USB device to and from the PCIe CEM connector when the USB mode of the USB interface is enabled.

19. The information handling system of claim 1, wherein the management controller is coupled to the processor via a Platform Environment Control Interface.

* * * * *